US012544654B2

(12) United States Patent
Kuang et al.

(10) Patent No.: US 12,544,654 B2
(45) Date of Patent: Feb. 10, 2026

(54) DISPLAY PICTURE ADJUSTMENT METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Ye Kuang, Shenzhen (CN); Zhixin Gui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 303 days.

(21) Appl. No.: 18/212,632

(22) Filed: Jun. 21, 2023

(65) Prior Publication Data
US 2023/0330518 A1    Oct. 19, 2023

Related U.S. Application Data

(63) Continuation of application No. PCT/CN2022/126917, filed on Oct. 24, 2022.

(30) Foreign Application Priority Data

Oct. 29, 2021   (CN) .......................... 202111276177.0

(51) Int. Cl.
*A63F 13/2145*   (2014.01)
*A63F 13/52*     (2014.01)
(Continued)

(52) U.S. Cl.
CPC .......... *A63F 13/2145* (2014.09); *A63F 13/52* (2014.09); *A63F 13/55* (2014.09);
(Continued)

(58) Field of Classification Search
CPC ...... A63F 13/2145; A63F 13/52; A63F 13/55; A63F 13/822; G06F 3/0486
See application file for complete search history.

(56) References Cited

U.S. PATENT DOCUMENTS

2017/0344216 A1   11/2017  Hartman
2019/0118078 A1*   4/2019  Li ....................... A63F 13/2145
(Continued)

FOREIGN PATENT DOCUMENTS

CN    108525295 A    9/2018
CN    109224438 A    1/2019
(Continued)

OTHER PUBLICATIONS

Tencent Technology, Korean Office Action, KR Patent Application No. 10-2023-7030083, Mar. 25, 2025, 31 pgs.
(Continued)

*Primary Examiner* — Yingchuan Zhang
(74) *Attorney, Agent, or Firm* — Morgan, Lewis & Bockius LLP

(57) ABSTRACT

This application discloses a method for updating a virtual scene performed by an electronic device. The method includes: displaying a first scene picture of a virtual scene in a display interface; determining a current position of a continuous trigger operation in the display interface; and when the current position satisfies a picture adjustment trigger condition, adjusting the virtual scene picture in the display interface at an adjustment speed according to the current position.

22 Claims, 12 Drawing Sheets

(51) Int. Cl.
   *A63F 13/55*    (2014.01)
   *A63F 13/822*   (2014.01)
   *G06F 3/0486*   (2013.01)

(52) U.S. Cl.
   CPC .......... *A63F 13/822* (2014.09); *G06F 3/0486* (2013.01); *A63F 2300/308* (2013.01); *A63F 2300/807* (2013.01)

(56) References Cited

U.S. PATENT DOCUMENTS

| 2021/0322864 | A1 | 10/2021 | Shao et al. |
| 2021/0322865 | A1* | 10/2021 | Shao .................... A63F 13/42 |
| 2022/0004259 | A1* | 1/2022 | Nagata ................. G06F 3/0485 |

FOREIGN PATENT DOCUMENTS

| CN | 109568956 A | 4/2019 |
| CN | 110597594 A | 12/2019 |
| CN | 111475087 A | 7/2020 |
| CN | 111773711 A | 10/2020 |
| CN | 112370780 A | 2/2021 |
| CN | 112807692 A | 5/2021 |
| CN | 113082697 A | 7/2021 |
| CN | 113144601 A | 7/2021 |
| CN | 113318434 A | 8/2021 |
| CN | 113318447 A | 8/2021 |
| CN | 113996060 A | 2/2022 |
| JP | H 04234789 A | 8/1992 |
| JP | 2017192538 A | 10/2017 |
| JP | 2018533782 A | 11/2018 |
| KR | 20160020102 A | 2/2016 |

OTHER PUBLICATIONS

Tencent Technology, WO, PCT/CN2022/126917, Jan. 11, 2023, 5 pgs.

Tencent Technology, Japanese Office Action, JP Patent Application No. 2023-560951, Jun. 18, 2024, 9 pgs.

Tencent Technology, ISR, PCT/CN2022/126917, Jan. 10, 2023, 3 pgs.

* cited by examiner

US 12,544,654 B2

DISPLAY PICTURE ADJUSTMENT METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2022/126917, entitled "DISPLAY PICTURE ADJUSTMENT METHOD AND APPARATUS, STORAGE MEDIUM, AND ELECTRONIC DEVICE" filed on Oct. 24, 2022, which claims priority to Chinese Patent Application No. 202111276177.0 filed to the China Patent Office on Oct. 29, 2021 and entitled "DISPLAY PICTURE ADJUSTMENT METHOD AND APPARATUS, STORAGE MEDIUM, AND ELECTRONIC DEVICE", all of which is incorporated herein by reference in its entirety.

FIELD OF THE TECHNOLOGY

This application relates to the field of computers, and in particular, to a display picture adjustment method and apparatus, a storage medium, and an electronic device.

BACKGROUND OF THE DISCLOSURE

Nowadays, in real-time strategy (RTS) games, real-time tactics (RTT) games and other types of game applications, players are usually provided with a virtual world with a large scene space. However, due to the limitation of a screen size of a mobile terminal, a content in the virtual world is often not displayed in its entirety. When a player wishes to move a target object in the virtual world to a specified position in the scene, and the specified position is located outside a current display picture on the screen, it is necessary to adjust the picture currently displayed on the screen.

Currently, in the solution of adjusting the display picture in the related art, it is often necessary to add an additional adjustment control in the screen. For example, the picture displayed on the screen is adjusted by sliding a roulette displayed on the screen, and then the target object is placed at a specified position. Alternatively, the picture displayed on the screen is adjusted by clicking the switch key displayed on the screen, and then the target object is placed at a specified position.

However, the adjustment control occupies a display space of the screen, and the players are often required to perform a plurality of operations to adjust the specified position into the display picture when adjusting based on the adjustment control, which causes the problem of cumbersome operations.

For the foregoing problem, no effective solution has been provided at present.

SUMMARY

Embodiments of this application provide a display picture adjustment method and apparatus, a storage medium, and an electronic device, for use in at least solving the technical problem of low screen adjustment efficiency due to the need to perform a plurality of adjustment operations.

According to one aspect of the embodiments of this application, a method for updating a virtual scene is performed by an electronic device. The method includes:
 displaying a first scene picture of a virtual scene in a display interface;
 determining a current position of a continuous trigger operation in the display interface; and
 when the current position satisfies a picture adjustment trigger condition, adjusting the virtual scene picture in the display interface at an adjustment speed according to the current position.

According to another aspect of the embodiments of this application, a non-transitory computer-readable storage medium stores a computer program therein, where the computer program is configured to perform, when run by a processor of an electronic device, the display picture adjustment method.

According to still another aspect of the embodiments of this application, an electronic device is also provided. The electronic apparatus includes a memory and a processor, a computer program being stored in the memory, and the processor being configured to perform the display picture adjustment method through the computer program.

BRIEF DESCRIPTION OF THE DRAWINGS

The accompanying drawings described herein are used to provide a further understanding of this application, and constitute a part of this application. Exemplary embodiments of this application and descriptions thereof are used to explain this application, and do not constitute any inappropriate limitation to this application. In the accompanying drawings.

DESCRIPTION OF EMBODIMENTS

In order to make a person skilled in the art to better under the solutions of this application, the following clearly and completely describes the technical solutions of the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts fall within the scope of protection of this application.

In the description, claims, and the foregoing accompanying drawings of this application, the terms "first", "second", and so on are intended to distinguish similar objects but do not necessarily indicate a specific order or sequence. It is to be understood that such used data is changeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
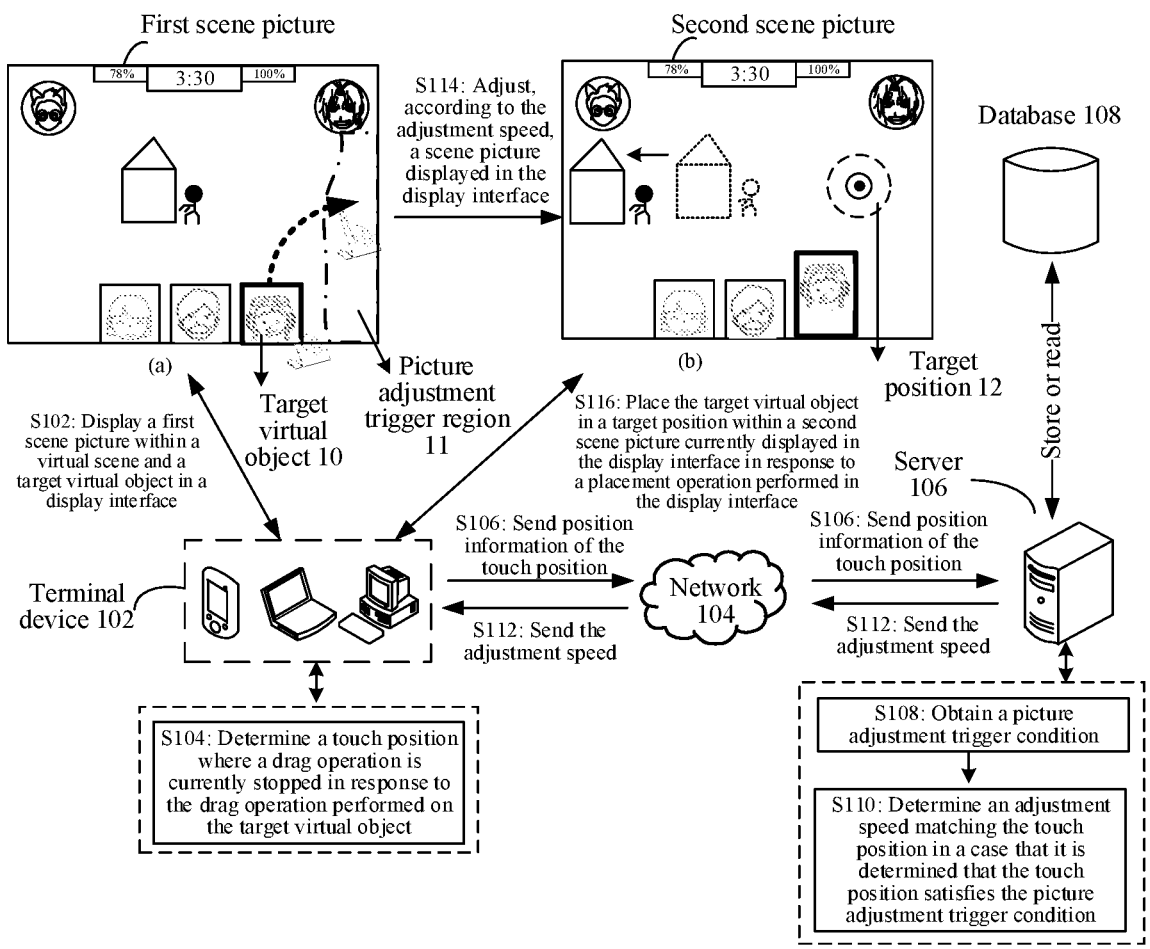
FIG. 1 is a schematic diagram of a display picture adjustment system according to embodiments of this application.

According to one aspect of the embodiments of this application, a display picture adjustment method is provided. In some embodiments, the display picture adjustment method may be, but is not limited to, a display picture adjustment system applied to the hardware environment as shown in FIG. 1. The display picture adjustment system may include, but is not limited to, a terminal device 102, a network 104, a server 106, and a database 108.

A client of a multimedia application (APP) runs in the terminal device 102. The terminal device 102 includes a human-computer interaction screen, a processor, and a memory. The human-computer interaction screen is configured to display a first scene picture within a virtual scene and a target virtual object, and is also configured to provide a human-computer interaction interface to receive a human-computer interaction operation for controlling a virtual object in the virtual scene. The virtual object completes a processing task set in the virtual scene, for example, the multimedia application is a game application and the processing task is a game task. The processor is configured to generate an interaction instruction in response to the human-computer interaction operation, and send the interaction instruction to the server. The memory is configured to store related attribute data, such as picture data of a scene picture, and character attribute information of a target virtual object controlled by a client. The attribute information here may include, but is not limited to, information such as a state or a position used for the target virtual object.

In addition, the server 106 includes a processing engine. The processing engine is configured to perform a storage or read operation on the database 108. Specifically, the processing engine determines, according to a touch position fed back by a terminal device, an adjustment speed of a scene picture currently displayed on the terminal device 102, pulls picture data of a corresponding scene picture from the database 108, and sends the picture data to the terminal device 102 for display to quickly place a controlled target virtual object into an adjusted scene picture.

The specific process is shown in the following steps:

Step S102: Display a first scene picture within a virtual scene and a target virtual object 10 in the display interface of the terminal device 102. The first scene picture is shown in (a) of FIG. 1, and pictures of a spire building and a reference object are displayed in the middle of the interface.

Step S104: The terminal device 102 determines a touch position where a drag operation is currently stopped in response to the drag operation performed on the target virtual object (such as a bold dashed trajectory shown in (a) of FIG. 1).

Step S106: The terminal device 102 sends position information of the touch position to the server 106 through the network 104.

Step S108: The server 106 obtains a picture adjustment trigger condition from the database 108. For example, the picture adjustment trigger condition is that the touch position is located in the picture adjustment trigger region, e.g., as shown in (a) of FIG. 1, a picture adjustment trigger region 11 circled by the dotted line.

Step S110: Determine an adjustment speed matching the touch position when the server 106 determines that the touch position satisfies the picture adjustment trigger condition.

Step S112: The server 106 returns the adjustment speed to the terminal device 102 through the network 104.

Step S114: The terminal device 102 adjusts, according to the adjustment speed, a scene picture displayed in the display interface.

Step S116: In response to a placement operation performed in the display interface, the terminal device 102 places the target virtual object 10 at a target position 12 within a second scene picture currently displayed in the display interface (as shown in (b) of FIG. 1, pictures of a spire building and a reference object are displayed in a left position of the interface).

As another optional implementation, when the terminal device 102 has a relatively strong computing processing capability, steps S108-S110 may be implemented by the terminal device 102. This is an example, which is not limited in this embodiment.

In this embodiment, after displaying a first scene picture within a virtual scene and a target virtual object in the display interface, in response to a drag operation performed on the target virtual object, a touch position where the drag operation is currently stopped is determined. Moreover, when the touch position satisfies a picture adjustment trigger condition, the scene picture displayed in the display interface is adjusted according to an adjustment speed matching the touch position. Then in response to a placement operation performed in the display interface, the target virtual object is placed in a target position within a second scene picture currently displayed in the display interface. That is to say, when the target virtual object is dragged in the display interface having a first scene picture displayed, and the touch position of the drag operation satisfies the picture adjustment trigger condition, the scene picture currently displayed in the display interface is automatically and flexibly adjusted according to the adjustment speed matching the touch position. Moreover, within the second scene picture currently displayed in the display interface after adjustment, in response to a placement operation, the target virtual object is directly placed at the target position in the second scene picture. In this way, without adding an additional adjustment control in the display interface, the scene picture currently displayed in the display interface can be directly adjusted according to the touch position of the drag operation, such that the target virtual object can be quickly placed at a target location other than that in the first scene picture, which not only saves a display space in the display interface, but also simplifies a picture adjustment operation, and achieves the effect of improving the efficiency of the picture adjustment operation. Furthermore, the problem in the related art of low adjustment efficiency caused by cumbersome operations in the picture adjustment process that requires a plurality of operations of a player during an adjustment control-based adjustment is solved.

In some embodiments, the terminal device may be a terminal device having a target client configured, and may include, but is not limited to, at least one of the following: a mobile phone (e.g. Android mobile phone, iOS mobile phone, etc.), a laptop, a tablet, a palmtop computer, a mobile Internet device (MID), a PAD, a desktop computer, a smart TV, etc. The target client may be a video client, an instant communication client, a browser client, an education client and other clients that support and allow to run multimedia applications (such as game applications).

The network may include, but is not limited to: a wired network and a wireless network. The wired network includes: a local area network, a metropolitan area network, and a wide area network. The wireless network includes: Bluetooth, WiFi, and other networks that implement the wireless communication. The server may be a single server, a server cluster including a plurality of servers, or a cloud server. The foregoing is merely an example, which is not limited in this embodiment.

Figure 2:
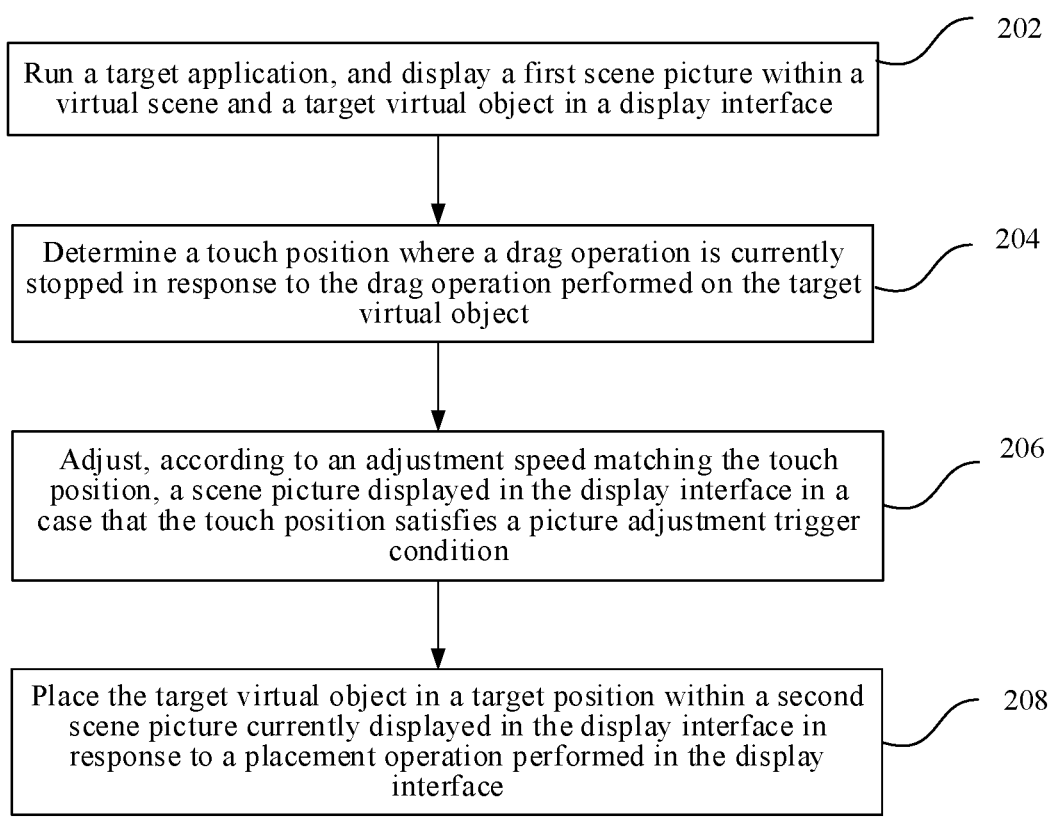
FIG. 2 is a flowchart of a display picture adjustment method according to embodiments of this application.

In some embodiments, as shown in FIG. 2, the display picture adjustment method is applied to an electronic device, for example, the terminal device 102 in FIG. 1, or jointly completed by the terminal device 102 and the server 106 in FIG. 1. The method includes:

S202: Run a target application, and display a first scene picture within a virtual scene and a target virtual object in a display interface.

In this embodiment, the target application is a multimedia application. The display picture adjustment method may be, but is not limited to, being applied to a multimedia application installed in a mobile terminal. The multimedia application can provide a user with a service of completing an intended processing tasks in a virtual scene. For example, the multimedia application is a game terminal application which can complete intended battle game tasks in a virtual scene, such as real-time strategy (RTS) game and a real-time tactics (RTT) game.

The battle game may be, but is not limited to, a game task that is completed through battle interaction between a virtual character in a virtual scene controlled by a current player through a human-computer interaction operation, and a virtual character controlled by another player. The battle game task here may be, but is not limited to, run in an application (e.g. a game APP which does not independently run) in the form of a plug-in and an applet, or run in an application (e.g. a game APP which independently runs) in a game engine.

The type of the game terminal application may include, but is not limited to, at least one of the following: a two-dimensional (2D) game application, a three-dimensional (3D) game application, a virtual reality (VR) game application, an augmented reality (AR) game application, and a mixed reality (MR) game application. The foregoing is merely an example, which is not limited in this embodiment.

In some embodiments, the target virtual object may be, but is not limited to, a to-be-moved virtual object displayed within the first scene picture. That is, an object that is located in the virtual scene and has a position needed to be adjusted. The description is provided with reference to the contents shown in FIG. 3. A first scene picture of a virtual scene provided by a multimedia application is shown as 302, and a virtual object to be moved and placed is shown as 304. A display position relationship between the two in the display interface is shown in (a) of FIG. 3. In this case, the virtual object 304 is located within the first scene picture 302.

Moreover, in this embodiment, the target virtual object may be, but is not limited to, a to-be-added virtual object which is not displayed in the first scene picture, that is, an object that has not yet entered the virtual scene but is in a to-be-added (or to-be-presented) state, e.g. a virtual character (e.g. a character played by a virtual person, a virtual animal and other virtual images) within a virtual scene, a virtual item, a virtual vehicle, a virtual prop, etc. The foregoing is an example, which is not limited in this embodiment.

In some embodiments, a user interface (UI) control in the display interface for implementing a control operation is not included in the first scene picture. Moreover, user account information of a client that logs in to the multimedia application, such as a user avatar and an account ID may also be displayed in the first scene picture.

S204: Determine a touch position where a drag operation is currently stopped in response to the drag operation performed on a target virtual object.

In some embodiments, the drag operation may be, but is not limited to, a touchscreen sliding operation performed on a touchscreen of a mobile terminal. In a sliding process, the touch position may be, but is not limited to, each position passed by a sliding trajectory during the dragging and sliding process performed after the user presses the target virtual object.

S206: Adjust, according to an adjustment speed matching the touch position, a scene picture displayed in the display interface when the touch position satisfies a picture adjustment trigger condition.

In some embodiments, the picture adjustment trigger condition may be, but is not limited to that the touch position is located within a picture adjustment trigger region configured for the display interface. That is to say, when the touch position moves into the picture adjustment trigger region, it is determined that the touch position satisfies the picture adjustment trigger condition, so as to start to control the scene picture displayed in the display interface, and roll the scene picture in the display interface according to an adjustment speed matching the touch position located within the picture adjustment trigger region (hereinafter referred to as screen scrolling). However, when the touch position does not move into the picture adjustment trigger region, it is determined that the touch position does not satisfy the picture adjustment trigger condition.

Moreover, in this embodiment, when the touch position moves into the picture adjustment trigger region, and then moves outside the picture adjustment trigger region, the rolling scene picture in the display interface is stopped (hereinafter referred to as stopping screen scrolling).

In this embodiment, the adjustment speed is configured according to the touch position within the picture adjustment trigger region. That is to say, different adjustment speeds are matched according to different touch positions of the touch position within the picture adjustment trigger region. For example, assuming that the picture adjustment trigger region is located at a boundary of the display interface, the closer the touch position to the boundary of the display interface, the greater a corresponding adjustment speed value; the farther the touch position to the boundary of the display interface, the smaller the corresponding adjustment speed value, so as to achieve the effect of flexibly controlling an adjustment progress of the scene picture.

Figure 3:
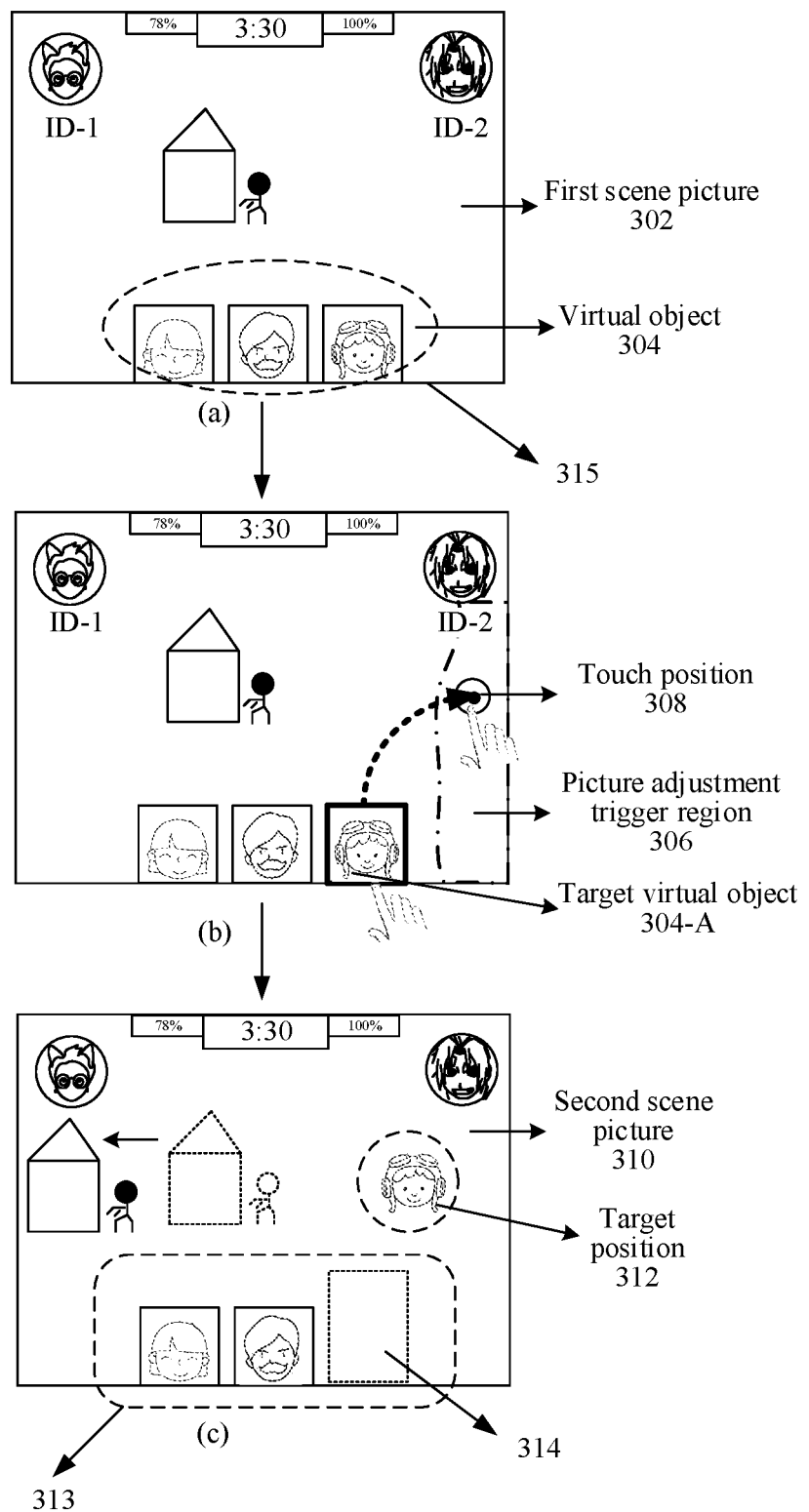
FIG. 3 is a schematic diagram of adjusting a display picture in a display interface according to embodiments of this application.

As shown in (b) of FIG. 3, when it is detected that a user is pressing a target virtual object 304-A in a virtual object 304 to be moved and placed, the target virtual object 304-A is dragged and moved, and the dragging trajectory is shown by a dotted line with an arrow in (b) of FIG. 3. When the target virtual object 304-A is dragged and moved to a touch position 308 of a picture adjustment trigger region 306, it is determined that the touch position 308 satisfies the picture adjustment trigger condition.

S208: Place the target virtual object in a target position within a second scene picture currently displayed in the display interface in response to a placement operation performed in the display interface.

In some embodiments, the placement operation is used for determining a position which the target virtual object is to be placed, and may include, but is not limited to:

1) a click operation of clicking a certain position in the display interface, for example, when pressing the target virtual object with the right hand to perform a drag operation, a certain position (that is, the target position) in the display interface is clicked with the left hand (such as double-clicking the screen) to complete the placement operation; and 2) a release operation after the drag operation, for example, when pressing the target virtual object with the right hand to perform a drag operation, the position where the right hand releases the pressed target virtual object (such as lifting the finger) is determined as the target position for placement.

The target position may be, but is not limited to:

1) A position within the picture adjustment trigger region.

For example, after the target virtual object is dragged into the picture adjustment trigger region by a drag operation, and is adjusted to a second scene picture, the position where the finger is lifted to release the target virtual object in the picture adjustment trigger region is taken as the target position.

Alternatively, after the target virtual object is dragged into the picture adjustment trigger region by a drag operation, and a click operation performed on a position within the picture adjustment trigger region of the second scene picture is detected, the scene screen adjustment operation can be stopped and the clicked position can be determined as the target position.

2) A position outside the picture adjustment trigger region.

For example, after the target virtual object is dragged into the picture adjustment trigger region by a drag operation, and is adjusted to a second scene picture, the position where the target virtual object is dragged outside the picture adjustment trigger region in the second scene picture and the finger is lifted to release the target virtual object is taken as the target position.

Alternatively, after the target virtual object is dragged into the picture adjustment trigger region by a drag operation, and a click operation performed on a position outside the picture adjustment trigger region of the second scene picture is detected, the scene screen adjustment operation can be stopped and the clicked position can be determined as the target position.

For example, as shown in (c) of FIG. 3, the scene picture displayed in the display interface is adjusted to a second scene picture 310 according to the adjustment speed matching the touch position 308 in (b) of FIG. 3. In this case, a spire building and a reference object are moved from the middle to the left of the field of view. Furthermore, if it is detected that the finger of the user moves out of the picture adjustment trigger region, and the pressed target virtual object 304-A is released at a target position 312, it is determined that a placement operation is detected and the target position 312 is determined as a placement position of the target virtual object 304-A.

Figure 4:
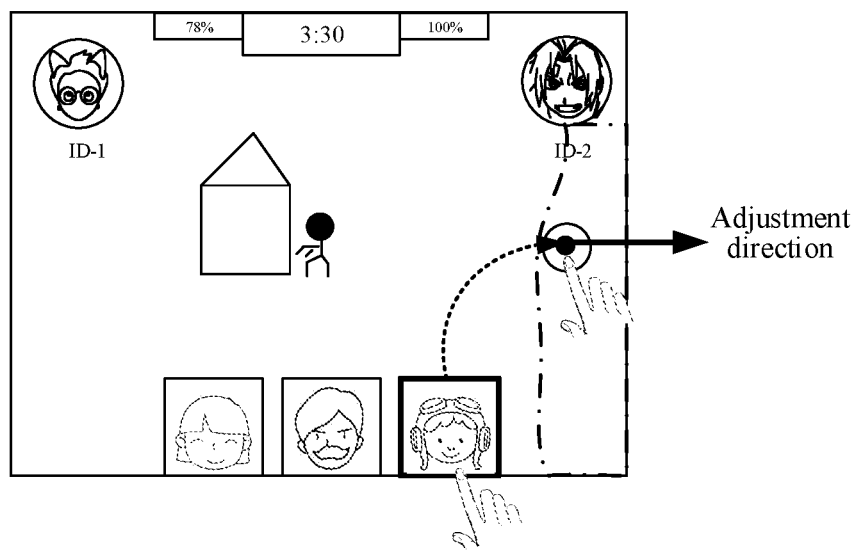
FIG. 4 is another schematic diagram of adjusting a display picture in a display interface according to embodiments of this application.

In some embodiments, an adjustment direction of the scene picture displayed in the display interface may be, but is not limited to, a tangential direction of a sliding trajectory generated by the drag operation. For example, assuming that a sliding trajectory of the drag operation is shown as the dotted line in FIG. 4, and is stopped at a circle position indicated by the finger, a tangential direction of a trajectory of the position is determined as the adjustment direction for the display picture. If it is determined that the adjustment direction points to a right side of a vertical right boundary shown in FIG. 4 through the determining process, it indicates that a viewing field of view needs to be adjusted to the right, and correspondingly, the scene picture in the display interface is moved to the left.

Figure 5:
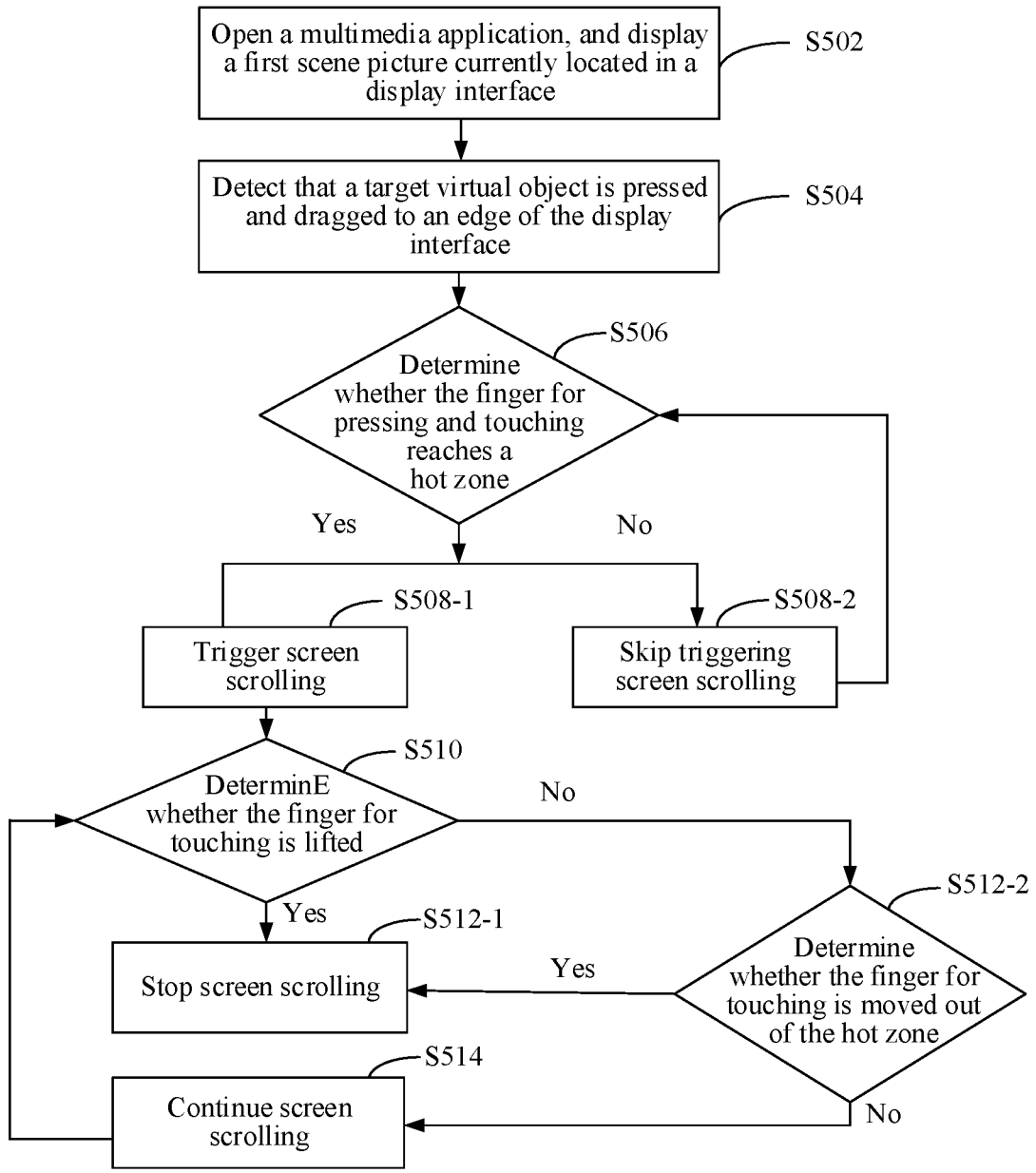
FIG. 5 is another flowchart of a display picture adjustment method according to embodiments of this application.

Specifically, the description of the adjustment process is provided with reference to the process shown in FIG. 5.

Step S502: Open a multimedia application, and display a first scene picture currently located in a display interface.

For example, the multimedia application is a game application.

Step S504: Detect that a target virtual object is pressed and dragged to an edge of the display interface, that is, a finger of a user performs pressing and touching operations.

Step S506: Determine whether the finger for pressing and touching reaches a picture adjustment trigger region (hereinafter referred to as a hot zone), that is, determine whether a position of the finger is within the picture adjustment trigger region; if the finger reaches the hot zone, perform step S508-1, and trigger screen scrolling, that is, roll a scene picture in the display interface; and if the finger does not reach the hot zone, perform step S508-2, and skip triggering screen scrolling.

Step S510: Determine whether the finger for touching is lifted, that is, the finger no longer presses and touches the target virtual object; if it is determined that the finger is lifted, perform step S512-1, and stop screen scrolling; if it is determined that the finger is not lifted, perform step S512-2, and determine whether the finger for touching is moved out of the hot zone; if it is determined that the finger is moved out of the hot zone, stop screen scrolling, as in step S512-1; and if it is determined that the finger is not moved out of the hot zone, continue screen scrolling, as in step S514.

According to the embodiments provided in this application, when the target virtual object is dragged in the display interface having a first scene picture displayed, and the touch position of the drag operation satisfies the picture adjustment trigger condition, the scene picture currently displayed in the display interface is automatically and flexibly adjusted according to the adjustment speed matching the touch position. Moreover, within the second scene picture currently displayed in the display interface after adjustment, in response to a placement operation, the target virtual object is directly placed at the target position in the second scene picture. In this way, without adding an additional adjustment control in the display interface, the scene picture currently displayed in the display interface can be directly adjusted according to the touch position of the drag operation, such that the target virtual object can be quickly placed at a target location other than that in the first scene picture, which not only saves a display space in the display interface, but also simplifies a picture adjustment operation, and achieves the effect of improving the efficiency of the picture adjustment operation. Furthermore, the problem in the related art of low adjustment efficiency caused by cumbersome operations in the picture adjustment process that requires a plurality of operations of a player during an adjustment control-based adjustment is solved.

As an optional solution, after the determining a touch position where a drag operation is currently stopped, the method further includes:

S1: Determine the touch position satisfies the picture adjustment trigger condition when it is determined that a touch position is located within a picture adjustment trigger region configured in the display interface.

S2: Obtain a boundary distance between the touch position and each boundary of the display interface.

S3: Determine an adjustment speed based on the boundary distance.

In some embodiments, the picture adjustment trigger region may be, but is not limited to, a closed ring region located at an edge of the display interface. Thus, when the touch operation slides to any boundary of the display interface, the picture adjustment in a direction corresponding to the boundary can be triggered.

Moreover, in this embodiment, the picture adjustment trigger region may include, but not limited to the following types: 1) an avoiding UI control type, 2) a covering UI control type, and 3) a mixed type.

1) The avoiding UI control type represents that no hot zone is set at a position where a UI control is set in the display interface, but the region covered by the hot zone is still guaranteed to be continuous and can be connected into a ring.
2) The covering UI control type represents that a hot zone is set at the topmost layer of the display interface. When a screen scrolling operation is triggered (that is, when the scene picture displayed in the display interface is adjusted), the UI control on the display interface is reset to be a locked state to avoid mis-touch interaction on the UI control.
3) The mixed type is a mixture of the two types above, and includes two types of mixed forms as follows:

Form 1: the two types are combined according to different subregions, for example, the avoiding UI control type is located in a subregion of an inner edge of the display interface, and the covering UI control type is located in a subregion of an outer edge of the display interface.

Form 2: the two regions are adaptively combined. According to the avoiding UI control type, a hot zone is set in a region where a UI control is set, and according to the covering UI control type, a hot zone is set in a region where no UI control is set.

The foregoing content is an example, and the combination mode may also be set to be different according to the actual situation, which is not limited here.

Details are described with reference to the following example. In the process of dragging and moving the target virtual object out of the first scene picture displayed in a current field of view, a player can keep a current pressuring posture on the target virtual object and drag same to the edge of the display interface (that is, the screen).

Figure 6:
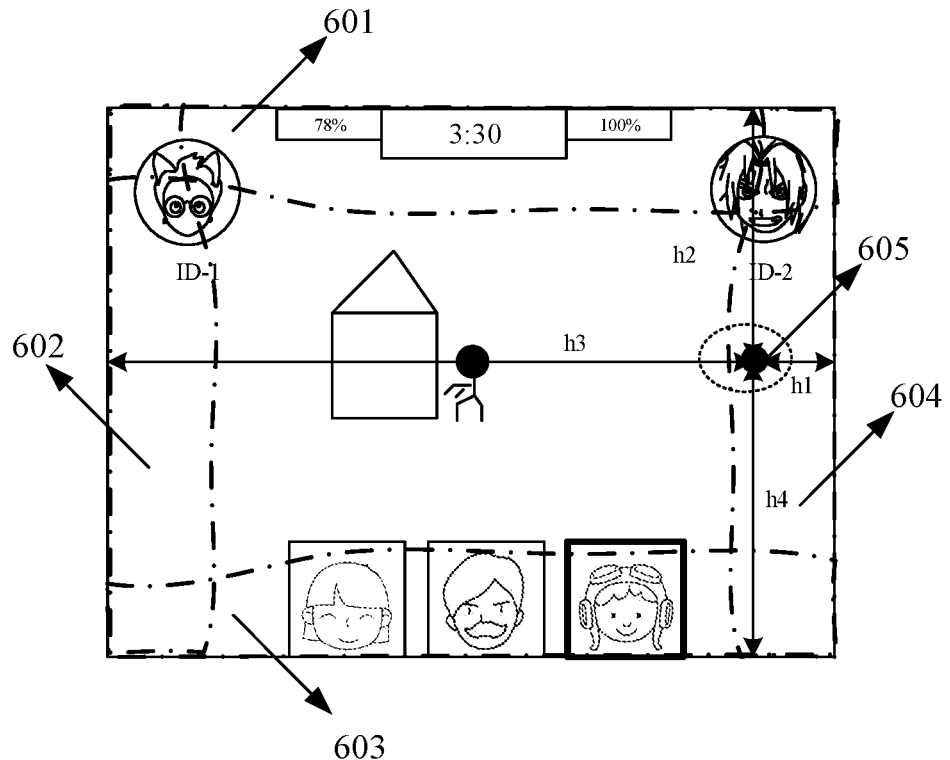
FIG. 6 is another schematic diagram of adjusting a display picture in a display interface according to embodiments of this application.

For example, as shown in FIG. 6, four edge regions 601, 602, 603, and 604 are configured at four edges of the display interface, respectively. As shown by a dotted line trajectory, the four edge regions 601, 602, 603, and 604 overlap two by two at the four corners of the display interface, and the entire region obtained by connecting the four edge regions is the picture adjustment trigger region.

After the touch position for dragging reaches the picture adjustment trigger region, an adjustment of a displayed scene picture can be triggered. The closer a position where the finger for touching is stopped to the edge of the display interface, the faster the screen scrolling speed. If it is detected that the finger for touching is lifted (that is, the finger is released), it is determined that a placement operation is detected, and the target virtual object is placed to a corresponding selected target position.

Furthermore, assuming that it is detected that the finger for touching is stopped in the hot zone during the process, the touch position for stopping is a position 605 in a dotted trajectory circle on the right of FIG. 6. A boundary distance between the touch position 605 and each boundary of the display interface can be obtained, e.g. a boundary distance h1 from a right boundary, a boundary distance h2 from an upper boundary, a boundary distance h3 from a left boundary, and a boundary distance h4 from a lower boundary. An adjustment speed matching the touch position can then be determined based on the boundary distances.

For example, when the obtained minimum boundary distance value is the boundary distance h1 between the touch position 605 and the right boundary, it indicates that the target virtual object has been dragged and moved to the hot zone 604 at a right edge. Furthermore, a corresponding adjustment speed is calculated according to the boundary distance h1.

According to the embodiments provided in this application, it is determined that the touch position satisfies the picture adjustment trigger condition when it is determined that the touch position is located within a picture adjustment trigger region configured in the display interface. The boundary distance between the touch position and each boundary of the display interface is then obtained, and the adjustment speed of picture adjustment is determined based on the boundary distance, so as to flexibly determine different adjustment speeds based on different touch positions to dynamically adjust the scene picture, thereby achieving the effect of improving the picture adjustment efficiency.

As an optional solution, the determining an adjustment speed based on the boundary distance includes:

S1: Obtain a reference value matching a type of the target application.

S2: Determine a minimum distance value among the boundary distances.

S3: Determine, as the adjustment speed, a ratio of the reference value to the minimum distance value.

In some embodiments, the reference value may be, but is not limited to, a constant n. The constant is an exclusive value determined according to a type of the target application and an operation feature. For example, the type of the target application includes a video class, an instant messaging class, a browser class, an education class, a news class, etc. The operation feature refers to a sliding operation, a click operation, a control trigger, etc. used when the user operates the target application.

Details are described with reference to the following example. Assuming that it is detected that the finger for touching is stopped in the hot zone during the process, and the stopped touch position is a position 702 in an edge region 701 (as shown by the dotted line trajectory) in FIG. 7. In a range of the hot zone, the greater the distance of the touch position from the edge, the slower the screen scrolling speed; the smaller the distance of the touch position from the edge, the faster the screen scrolling speed.

Figure 7:
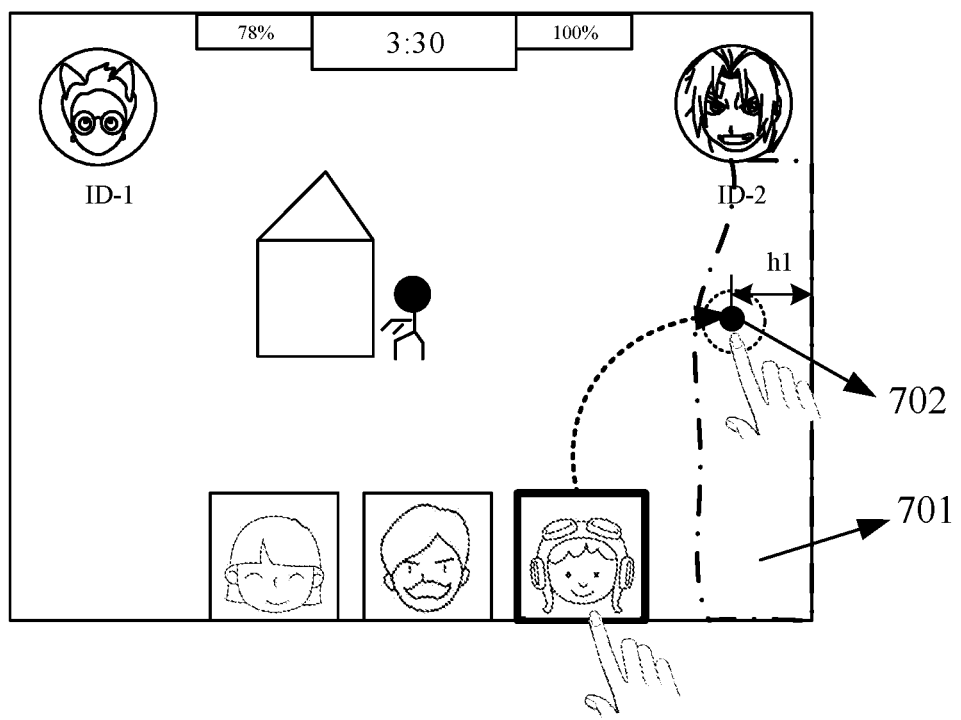
FIG. 7 is another schematic diagram of adjusting a display picture in a display interface according to embodiments of this application.

As shown in FIG. 6 and FIG. 7, among the four boundary distances, the boundary distance h1 between the touch position and the right boundary is the minimum boundary distance value. A screen scrolling speed v can be then calculated based on a formula below: v=n/h1.

Here, the adjustment speed is in an inverse correlation with the minimum boundary distance value. A calculation relationship between the two is not limited to the linear function, but may also include other functions, which is not repeated here.

According to the embodiments provided in this application, the adjustment speed is determined based on a ratio of the reference value to the minimum distance value so as to achieve the purpose of flexibly controlling the picture adjustment speed.

As an optional solution, after the determining a touch position where a drag operation is currently stopped, the method further includes:

determining the touch position does not satisfy the picture adjustment trigger condition when the touch position is not located within the picture adjustment trigger region configured in the display interface, and keeping displaying the first scene picture.

Figure 8:
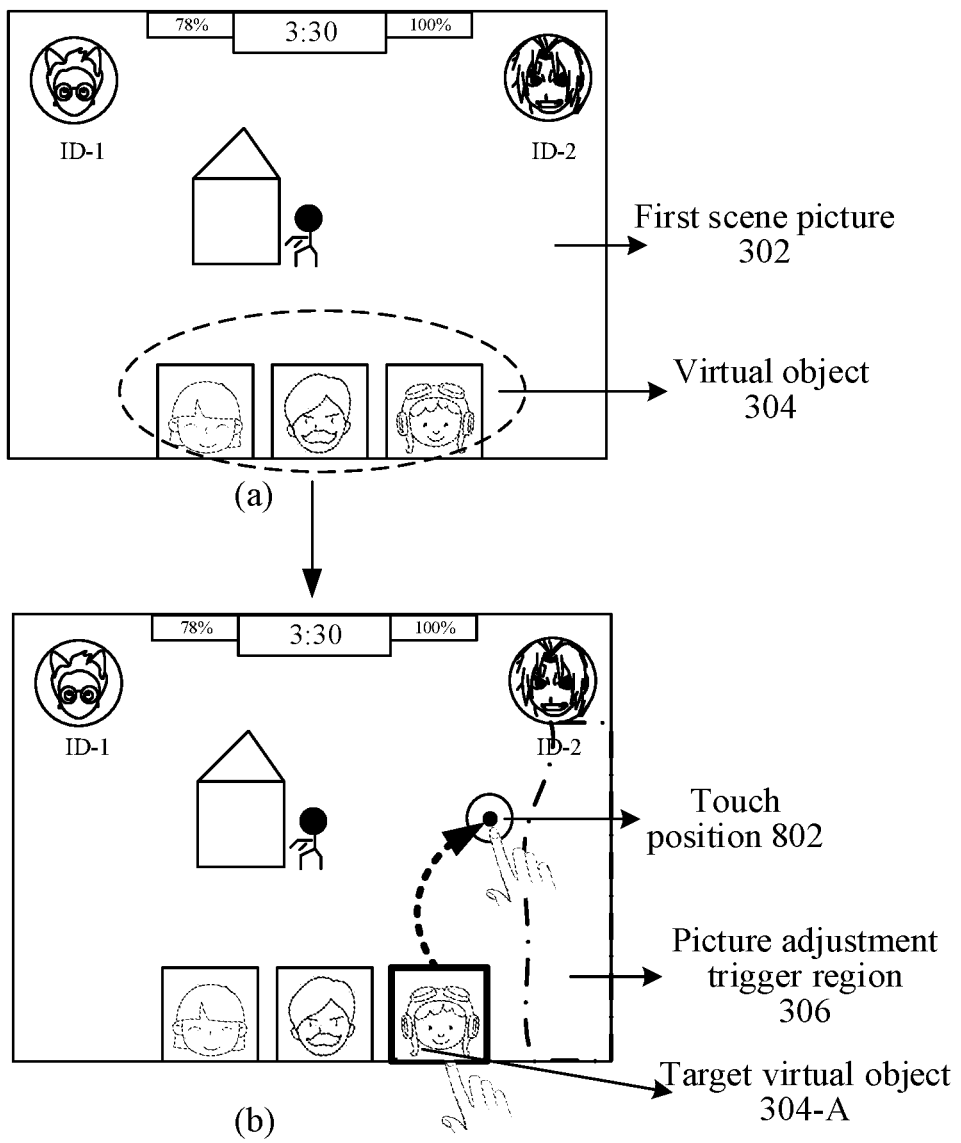
FIG. 8 is another schematic diagram of adjusting a display picture in a display interface according to embodiments of this application.

The description is provided with reference to the content shown in FIG. 8:

Assuming that the display position relationship in the display interface between the first scene picture 302 of the virtual scene provided by a target game application and the virtual object 304 to be moved and placed is shown in (a) of FIG. 8. If it is detected that a player is pressing the target virtual object 304-A, and dragging and moving same, the dragging trajectory is shown by a dotted line with an arrow in (b) of FIG. 8, and the picture adjustment trigger region 306 is shown as the region circled by the dotted line trajectory in (b) of FIG. 8. When the target virtual object 304-A is dragged and moved to the touch position 802 shown in (b) of FIG. 8, the touch position 802 is not located within the picture adjustment trigger region 306 configured in the display interface, such that it can be determined that the touch position 802 does not satisfy the picture adjustment trigger condition. That is to say, in the situation, the picture adjustment is not triggered, and the first scene picture is kept displaying in the display interface.

According to the embodiments provided in this application, it is determined that the touch position does not satisfy the picture adjustment trigger condition when the touch position is not located within the picture adjustment trigger region configured in the display interface, and the first scene picture is kept displaying. In this way, the screen scrolling is triggered when the picture adjustment trigger condition is satisfied, so as to ensure the accuracy of the picture adjustment, and the screen scrolling is not triggered when the picture adjustment trigger condition is not satisfied, so as to avoid the problem of unnecessary waste of resources caused by a mis-touch adjustment.

As an optional solution, during the adjusting, according to an adjustment speed matching the touch position, a scene picture displayed in the display interface, the method further includes:

1) When the touch position is not detected within the picture adjustment trigger region and a dragging end point of the touch position is located within the display interface, stopping adjusting the scene picture displayed in the display interface, and displaying, in the display interface, a scene picture presented at the time of stopping the adjustment.

Figure 9:
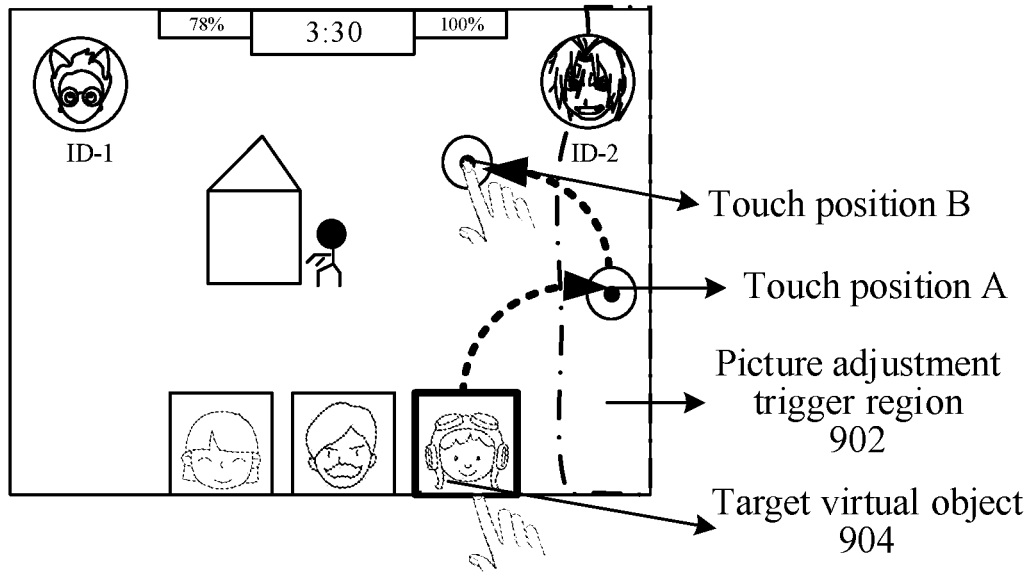
FIG. 9 is another schematic diagram of adjusting a display picture in a display interface according to embodiments of this application.

The description is provided with reference to the content shown in FIG. 9. Assuming that a first scene picture of a virtual scene provided by a target game application and a target virtual object 904 are displayed in the display interface. A picture adjustment trigger region 902 is configured at the edge of the display interface. The picture adjustment trigger region set on the right edge of the display interface is shown in FIG. 9, and other edge of the display interface is also set with picture adjustment trigger region to form a ring (not shown in the figure).

When it is detected that a player pressed the target virtual object 904, and performed dragging and moving on it, the dragging trajectory is shown by a dotted line with an arrow in (b) of FIG. 9. When drag and move the target virtual object 904 to a touch position A of the picture trigger region 902, the adjustment for the scene picture is triggered. When it is detected that the target virtual object 904 is again dragged and moved to a touch location B outside the picture trigger region 902 (that is, when the touch position is not detected in the picture adjustment trigger region and an dragging end point of the touch position is located within the display interface), the adjustment of the scene picture is stopped that is, the screen scrolling is stopped).

2) In response to a click-to-touch operation performed in the display interface, stop adjusting the scene picture displayed in the display interface, and display, in the display interface, a scene picture presented at the time of stopping the adjustment.

Figure 10:
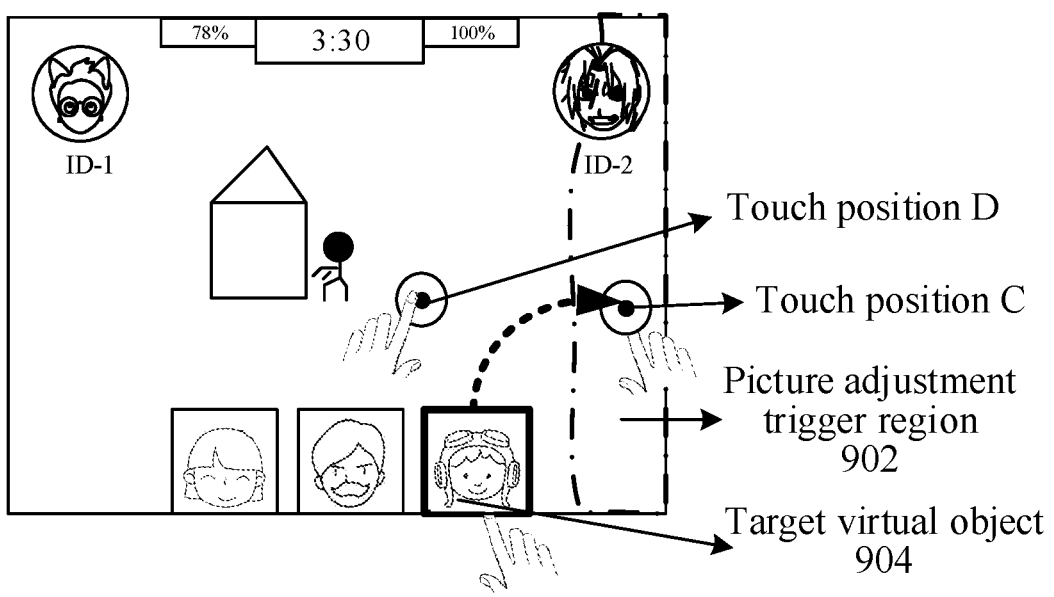
FIG. 10 is another schematic diagram of adjusting a display picture in a display interface according to embodiments of this application.

A description is provided with reference to the content shown in FIG. 10: Assuming that a first scene picture of a virtual scene provided by a target game application and a target virtual object 904 is displayed in the display interface. The edge of the display interface is configured with a picture adjustment trigger region 902. The picture adjustment trigger region set on a right edge of the display interface is shown in FIG. 10. Picture adjustment trigger regions are also set at other edges of the display interface to form a ring (not shown in the figure).

If it is detected that a player is pressing the target virtual object 904, and dragging and moving same, the dragging trajectory is shown by a dotted line with an arrow in FIG. 10. When the target virtual object 904 is dragged and moved to a touch position C of the picture trigger region 902, the adjustment of the scene picture is triggered (that is, screen scrolling). If a click operation (such as clicking on the screen) on a touch position D outside the picture trigger region 902 in the display interface is detected, that is, a click-to-touch operation is detected outside the picture adjustment trigger region, the adjustment of the scene picture is stopped (which can be called as, for example, stopping screen scrolling or canceling screen scrolling).

According to the embodiments provided in this application, in the process of adjusting the scene picture displayed in the display interface, when the touch position is not detected in the picture adjustment trigger region and the dragging end point of the touch position is located within the display interface, or, when the click-to-touch operation performed in the display interface is detected, the adjustment of the scene picture displayed in the display interface is stopped and the currently presented scene picture is displayed, such that the picture adjustment process can be timely stopped as needed.

As an optional solution, the placing the target virtual object in a target position within a second scene picture currently displayed in the display interface in response to a placement operation performed in the display interface includes:

detecting the placement operation in the scene picture presented at the time of stopping the adjustment, determining the scene picture presented at the time of stopping the adjustment as the second scene picture, and determining a position corresponding to the placement operation as the target position.

In some embodiments, the placement operation may be, but is not limited to, a position where the target virtual object is determined to be placed. The placement operation may include, but is not limited to: 1) a click operation of clicking a certain position in the display interface, and 2) a release operation after a drag operation.

Moreover, in this embodiment, the target position for placement may be a position located within the picture adjustment trigger region, or a position located outside the picture adjustment trigger region. That is to say, in the process of adjusting the scene picture in the display interface, any position can be clicked to cancel the picture adjustment (that is, aborting screen scrolling), and the click position is determined as the target position; or, in the process of adjusting the scene picture in the display interface, the touch position where the target virtual object is pressed is dragged to a position outside the picture adjustment trigger region within the display interface, and the finger is released to cancel the picture adjustment (that is, aborting screen scrolling), and the release position is determined as the target position for placement.

According to the embodiments provided in this application, the placement operation is detected in the scene picture presented at the time of stopping the adjustment, the scene picture presented at the time of stopping the adjustment is determined as the second scene picture, and a position corresponding to the placement operation is determined as the target position. In this way, the start and end of the picture adjustment are flexibly controlled directly through the touch position of the touch operation.

As an optional solution, after stopping adjusting the scene picture displayed in the display interface when the touch position is not detected within the picture adjustment trigger region and a dragging end point of the touch position is located outside the display interface, and displaying, in the display interface, a scene picture presented at the time of stopping the adjustment, the method further includes:

placing the target virtual object back to an original position before the drag operation is performed.

Details are described with reference to the following example. Assuming that a first scene picture of a virtual scene provided by a target game application and a target virtual object are displayed in the display interface. A picture adjustment trigger region is configured at the edge of the display interface. If it is detected that a player is pressing the target virtual object, and dragging and moving same, and the dragging trajectory indicates that the target virtual object is dragged and moved into the picture trigger region, the adjustment of the scene screen is triggered (that is, screen scrolling). If it is detected that the dragging trajectory extends out of the display interface, that is, the touch position is not detected in the picture adjustment trigger region, and the dragging end point of the touch position is located outside the display interface, the adjustment of the scene picture is stopped (which can be called as, for example, stopping screen scrolling or canceling screen scrolling), and it is determined that the moving and placement operation of a current target virtual object fails and the current target virtual object is placed back to the original position.

For example, the target virtual object is a pilot shown as the target virtual object 304-A in FIG. 3. When the drag operation slides out of the display interface, the pilot is placed back to an initial position 314 in a lower edge region 313 of the display interface. The region includes at least one object which does not enter the virtual scene. The at least one object which does not enter the virtual scene includes:

1) an object which satisfies an entering condition but has not been selected and added; and 2) an object which does not satisfy the entering condition.

Moreover, in this embodiment, after the picture adjustment process in the above situation is stopped, the target virtual object is placed back to the original position, but the adjusted second scene picture is continued displaying in the display interface without switching back to the first scene picture.

According to the embodiments provided in this application, when the touch position is not detected in the picture adjustment trigger region and the dragging end point of the touch position is located outside the display interface, the screen scrolling is stopped and the target virtual object which fails to be dragged is placed back to the original position, thereby ensuring that the placement position of the target virtual object meets the expectation and avoiding the problem of increased operation complexity caused by the need to repeat a plurality of adjustments after incorrect placement.

As an optional solution, before the displaying a first scene picture within a virtual scene and a target virtual object in a display interface, the method further includes one of the following:

1) Configuring the picture adjustment trigger region within a non-operation region associated with each boundary of the display interface.

The non-operation region may be, but is not limited to, a position in the display interface where no UI control is set. Here the picture adjustment trigger region is of an avoiding UI control type. That is, the hot zone is not set at a position blocked by a UI, and the hot zone is still ensured to be connected into a ring, and a width of the annular region is equal.

Figure 11:
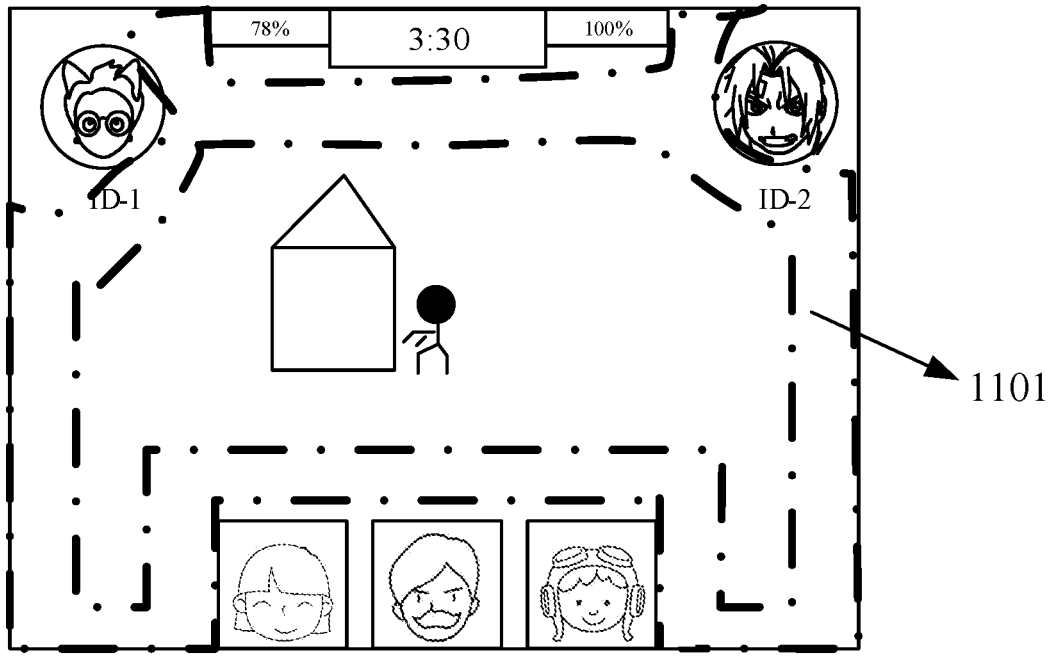
FIG. 11 is a schematic diagram of determining a picture adjustment trigger region in a display interface according to embodiments of this application.

For example, assuming that the picture adjustment trigger region of the avoiding UI control type is as shown by a region 1101 circled by the dotted line trajectory in FIG. 11, and avoids the UI controls set on an upper left corner, an upper right corner, and a lower edge of the display interface. A width of the region 1101 is equal at each position, thus ensuring that a corresponding calculation manner of the adjustment speed is unified when the drag operation moves from any direction into the picture adjustment trigger region, without the need to distinguish the calculation manner, and achieving the purpose of simplifying the calculation steps of the adjustment speed.

2) Displaying an operation floating layer on the display interface, and configuring the picture adjustment trigger region on the operation floating layer, the operation floating layer being displayed in a floating manner above an operation region in the display interface.

The operation floating layer may be, but is not limited to, a layer set on the display interface. Here the picture adjustment trigger region is of a covering UI control type. That is, the hot zone is set at the topmost layer. When the user triggers the screen scrolling operation, the UI control on the display interface can be adjusted to a locked state (that is, a non-interactive state). The hot zone here may be, but is not limited to, a square ring, and a width of each part is equal.

Figure 12:
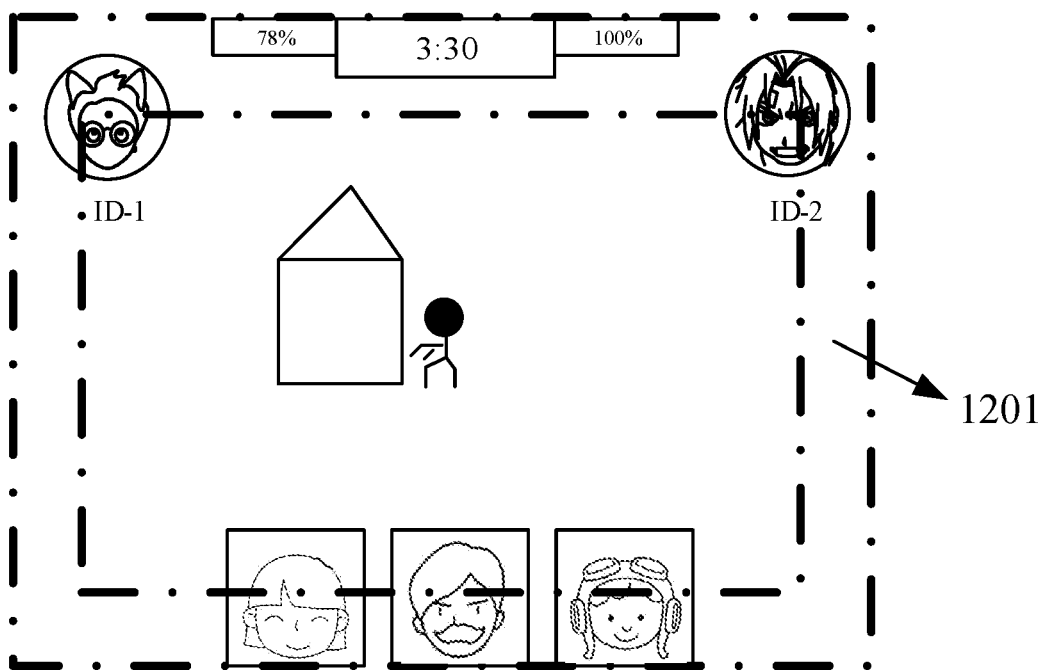
FIG. 12 is another schematic diagram of determining a picture adjustment trigger region in a display interface according to embodiments of this application.

For example, assuming that the picture adjustment trigger region of the covering UI control type is shown by a region 1201 circled by the dotted line trajectory in FIG. 12. The region 1201 is set on a floating layer above the display interface, and each position of the region 1201 is of equal width from the boundary, thus ensuring that a corresponding calculation manner of the adjustment speed is unified when the drag operation moves from any direction into the picture adjustment trigger region, without the need to distinguish the calculation manner, and achieving the purpose of simplifying the calculation steps of the adjustment speed.

3) Configuring a first subregion of the picture adjustment trigger region within a non-operation region associated with each boundary of the display interface, and configuring a second subregion of the picture adjustment trigger region on an operation floating layer displayed on the display interface.

The manner of configuring two subregions corresponds to the mixed type, that is, the avoiding UI control type and the covering UI control type are mixed.

Figure 13:
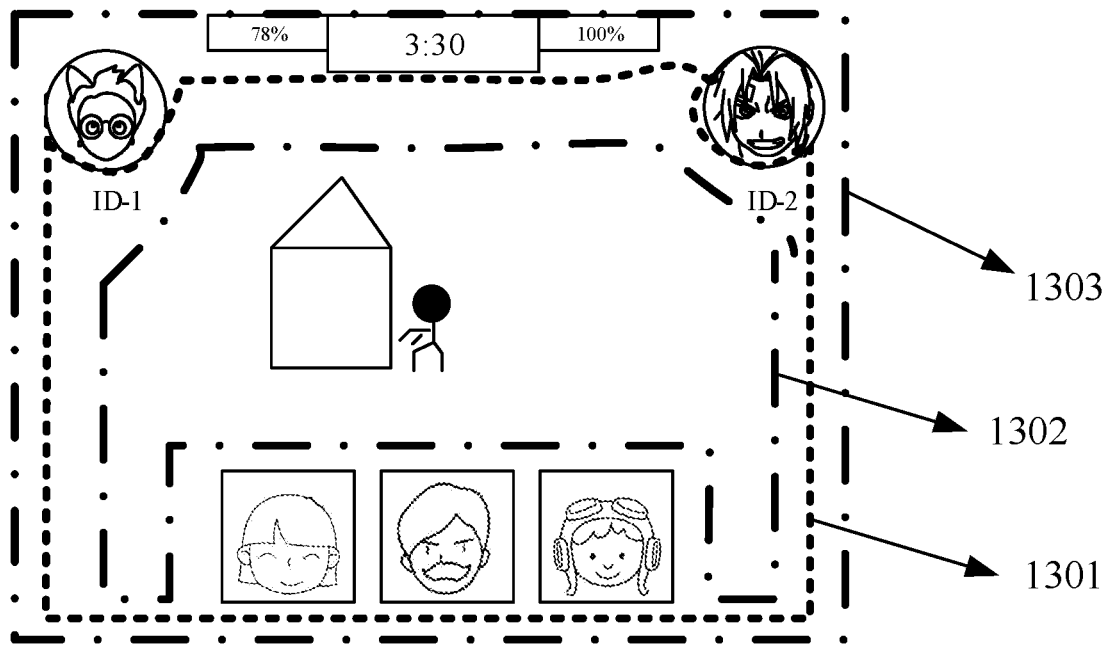
FIG. 13 is another schematic diagram of determining a picture adjustment trigger region in a display interface according to embodiments of this application.

For example, as shown in FIG. 13, the entire picture adjustment trigger region includes a first subregion located between a dashed line trajectory 1301 and a dotted line trajectory 1302, and a second subregion located between the dashed line trajectory 1301 and a dotted line trajectory 1303. Here, the first subregion avoids the UI control, and a picture adjustment region that avoids the UI control can be set, while the second subregion covers the UI control, and a picture adjustment region that covers the UI control can be set.

As shown in FIG. 13, both the first subregion and the second subregion are irregular regions. When the touch position is located in the first subregion at an inner edge, the adjustment speed may be determined according to the minimum value among the boundary distances between the touch position and the boundaries 1301, 1302. When the touch position is located in the second subregion at an outer edge, the adjustment speed may be determined according to the minimum value among the boundary distances between the touch position and the boundaries 1301, 1303. A relationship between the distance and the adjustment speed is described in $v=n/h1$.

According to the embodiments provided in this application, different types of picture adjustment trigger regions are set for the layout of the UI controls in the display interface, thus not only enriching the diversity of region styles, but also optimizing the operation, and avoiding the problem of poor user experience caused by the mis-touch of the user.

As an optional solution, after the determining a touch position where a drag operation is currently stopped, the method further includes:

S1: Determine the touch position satisfies the picture adjustment trigger condition when the touch position is located within a picture adjustment trigger region configured in the display interface.

S2: Determine the adjustment speed in response to an operation performed by a speed adjustment key displayed in the display interface.

In some embodiments, in the process that the touch position is located within the picture adjustment trigger region configured within the display interface to trigger the adjustment of the scene picture, other touch operations in the display interface may be combined to assist in adjusting the adjustment speed of the screen scrolling. The specific manner may include, but is not limited to:

1) During screen scrolling, a speed adjustment key (e.g. an acceleration key or a deceleration key) appears on the display interface, and in response to a click operation for the acceleration key or the deceleration key, the adjustment speed of the screen scrolling is accelerated/decelerated accordingly.

When the screen scrolling is aborted or canceled, the acceleration key or the deceleration key may be, but is not limited to be displayed or hidden, so as to achieve the purposes of saving the display space of the display interface and improving the utilization rate of display resources.

In addition, the acceleration key or the deceleration key here may be, but is not limited to being set in the region associated with the touch position, so as to perform the adjustment operation conveniently and quickly.

2) During screen scrolling, a combined gesture of the drag operation with one hand and the touch operation with the other hand is combined to correspondingly accelerate/decelerate the adjustment speed of the screen scrolling. For example, the touch operation with the other hand includes, but is not limited to: double-clicking, two-finger clicking, three-finger clicking or sliding up/down, etc. The gesture of the touch operation here is an example, which is not limited in this embodiment.

According to the embodiments provided in this application, upon detecting the touch position of the drag operation enters the picture adjustment trigger region to trigger the screen scrolling, other touch manners may also be combined to form a combined control strategy to flexibly adjust the adjustment speed of the screen scrolling, and enrich the adjustment manner to make it more diverse.

As an optional solution, the displaying a first scene picture within a virtual scene and a target virtual object in a display interface includes:

1) Displaying the first scene picture in the display interface, the target virtual object being located in the first scene picture.

Figure 14:
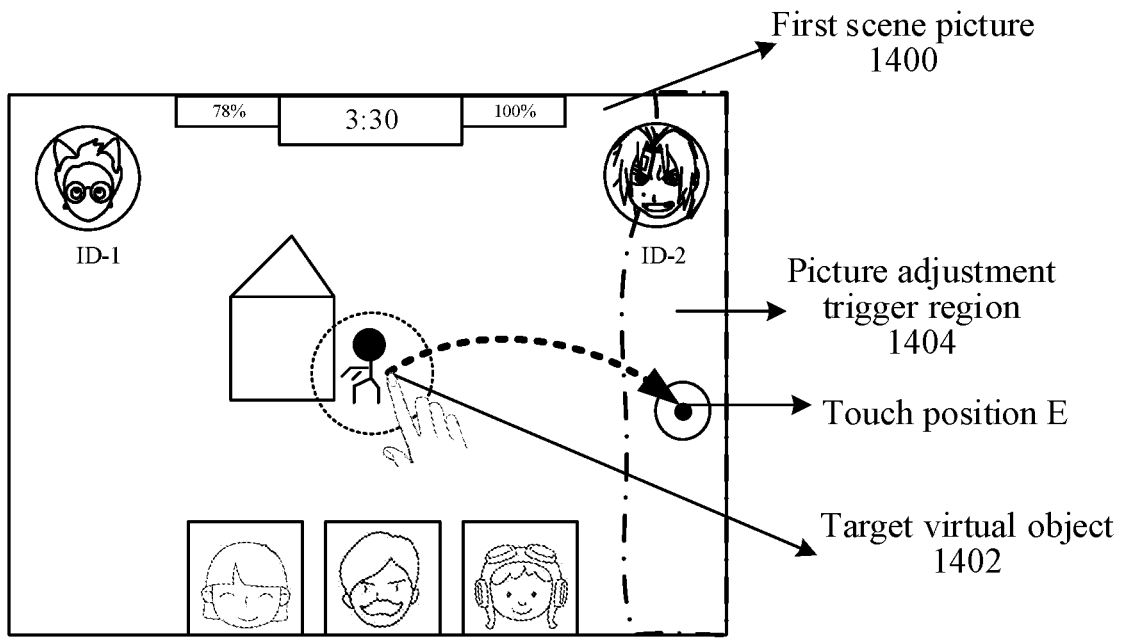
FIG. 14 is another schematic diagram of adjusting a display picture in a display interface according to embodiments of this application.

As shown in FIG. 14, assuming that a first scene picture 1400 within a virtual scene and a target virtual object 1402 are displayed in the display interface. The target virtual object 1402 is located in a first scene picture 1400. A picture adjustment trigger region 1404 is configured at the edge of the display interface.

Upon detecting that the target virtual object 1402 is dragged to a touch position E in the picture adjustment trigger region 1404, an adjustment process of the first scene picture 1400 is triggered.

2) Displaying the first scene picture in the display interface, the target virtual object being located in a candidate operation region outside the first scene picture, and the candidate operation region including at least one virtual object to be placed within the virtual scene.

For example, as shown in (a) of FIG. 3, the virtual object 304 to be added to the virtual scene is displayed in a candidate operation region 315 outside the first scene picture 302. As shown in (b) of FIG. 3, upon detecting that the target virtual object 304-A is dragged to the touch position 308 in the picture adjustment trigger region 306, an adjustment process of the first scene picture 302 is triggered.

According to the embodiments provided in this application, the picture adjustment process may be applied to a scene where a position of the virtual object displayed in the display interface (expected to be moved out of the current field of view) is moved and adjusted, and may also be applied to a scene where layout positioning is subjected to a virtual object which does not enter the virtual scene (expected to be positioned to be placed outside the current field of view). An application scene of picture adjustment is enriched, and the application range of picture adjustment is wider.

The embodiments of this application are specifically described with reference to the timing process shown in FIG. 15. The data processing method is executed by a terminal device. Specifically, a client having a multimedia application runs on the terminal device, and is divided into a presentation layer and a logic layer. The presentation layer is used for displaying a displayable picture content and the logic layer is used for executing a corresponding operation logic. For example, the client is a game client, and a user is a player.

Step S1502: A player opens a game client.

Step S1504: A presentation layer of the game client displays a default UI (e.g. a first scene picture) in a display interface.

Step S1506: The player determines, based on an observation, whether an item to be placed (e.g. a target virtual object) is dragged out of a screen (the display interface).

Step S1508: Directly place the item in a current interface when the player determines the item is not dragged out of the screen. Step S1510: The presentation layer of the game client transmits a real-time position signal of a finger for touching to a logic layer of the game client. Step S1512: The logic layer of the game client determines that screen scrolling is not triggered based on the real-time position, and determines that the item is successfully placed when the player lifts the finger.

Step S1514: Keep moving the finger to an edge of the screen when the player determines the item is dragged out of the screen. Step S1516: The presentation layer of the game client transmits a real-time position signal of a finger for touching to a logic layer of the game client. Step S1518: The logic layer of the game client determines whether the finger for touching is lifted. As in step S1520-1, abort the screen scrolling, and place the item at a corresponding position when the logic layer of the game client recognizes that the finger for touching is lifted. As in step S1520-2, determine that the finger for touching is still in a hot zone when the logic layer of the game client recognizes that the finger for touching is not lifted. In this case, perform step S1522, that is, the presentation layer of the game client continues the screen scrolling. As in step S1520-3, the logic layer of the game client recognizes that the finger for touching is not lifted and the finger moves out of the hot zone, perform step S1524, that is, the presentation layer of the game client pauses the screen scrolling.

Step S1526: The player detects the scene change indicated by the scene picture in the display interface, and determines whether the scene change meets the expectation of the player. As in step S1528, lift the finger and place the item when the scene change meets the expectation. Then perform steps S1530 and S1532.

Step S1530: The presentation layer of the game client transmits a real-time position signal of a finger for touching to a logic layer of the game client.

Step S1532: Place the item and abort the screen scrolling when the logic layer of the game client detects that the finger is lifted.

As in step S1534, use the other hand to cancel the screen scrolling when the scene change does not meet the expectation. Then perform steps S1536 and S1538.

Step S1536: The presentation layer of the game client transmits a real-time position signal of a finger for touching to a logic layer of the game client.

Step S1538: Abort the screen scrolling when the logic layer of the game client detects that the other finger clicks the screen.

Figure 15:
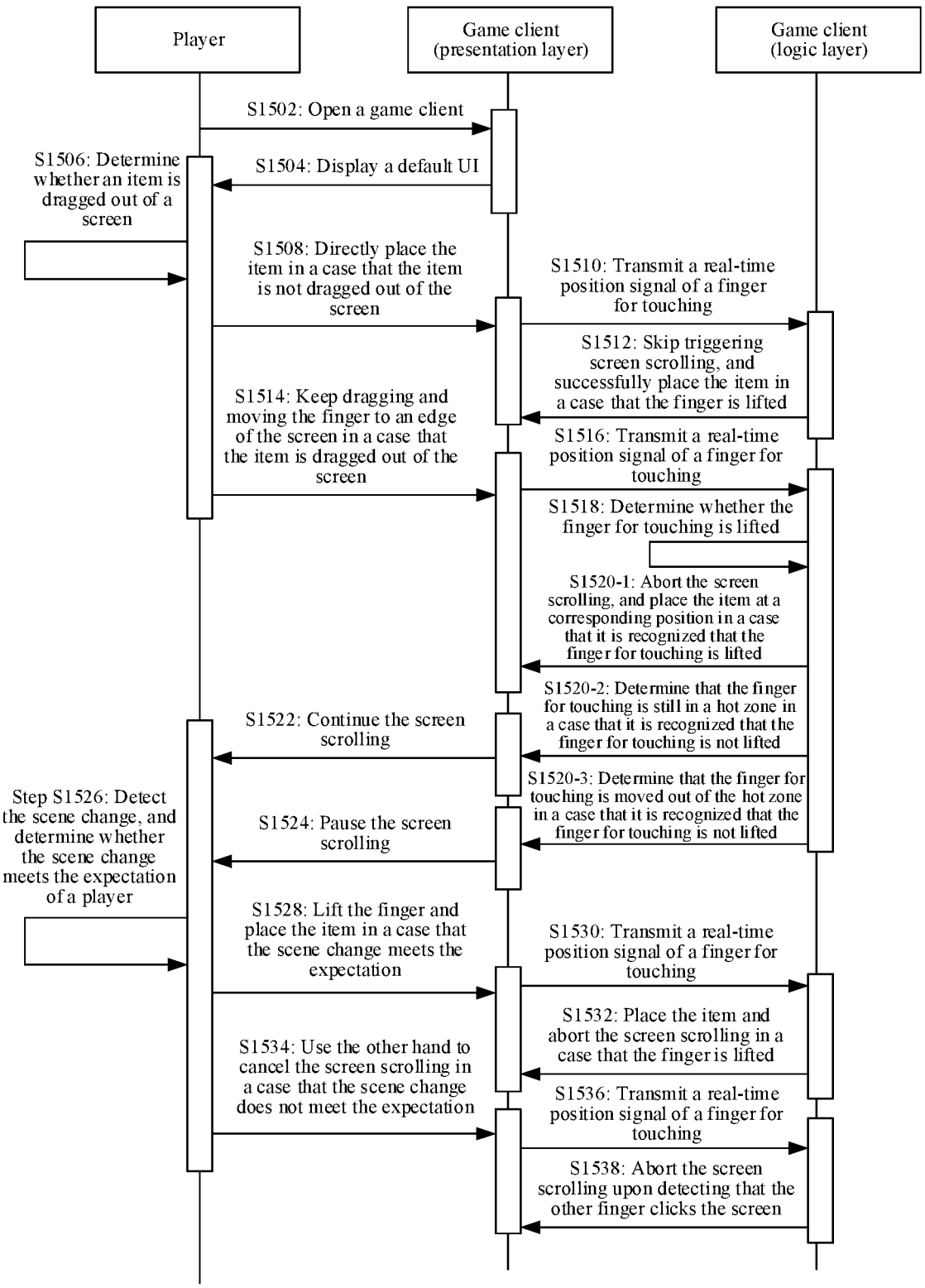
FIG. 15 is another flowchart of a display picture adjustment method according to embodiments of this application.

The steps and the orders thereof shown in FIG. 15 are examples, which are not limited in this embodiment.

For brevity of description, the foregoing method embodiments are described as a series of combinations of actions. However, it is to be understood by a person skilled in the art that this application is not limited to the order of the described actions because according to this application, some steps may be performed in other order or simultaneously. In addition, a person skilled in the art also knows that all the embodiments described in the description are exemplary embodiments, and the related actions and modules are not necessarily required by this application.

Figure 16:
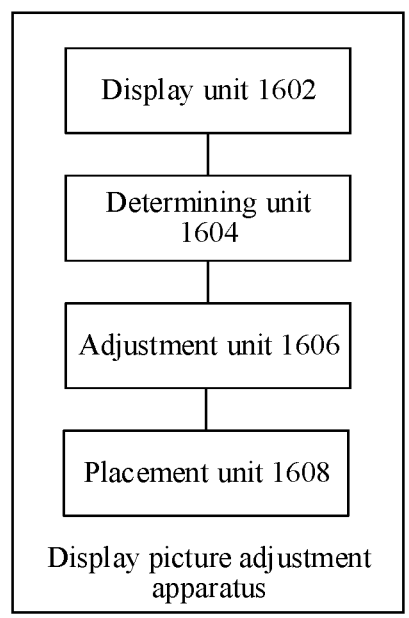
FIG. 16 is a schematic structural diagram of a display picture adjustment apparatus according to embodiments of this application.

According to another aspect of the embodiments of this application, a display picture adjustment apparatus is also provided for implementing the display picture adjustment method. As shown in FIG. 16, the apparatus includes:

a display unit 1602, configured to run a target application, and display a first scene picture within a virtual scene and a target virtual object in a display interface;

a determining unit 1604, configured to determine a touch position where a drag operation is currently stopped in response to the drag operation performed on the target virtual object;

an adjustment unit 1606, configured to adjust, according to an adjustment speed matching the touch position, a scene picture displayed in the display interface when the touch position satisfies a picture adjustment trigger condition; and a placement unit 1608, configured to place the target virtual object in a target position within a second scene picture currently displayed in the display interface in response to a placement operation performed in the display interface.

In one embodiment, the adjustment unit 1606 is further configured to determine the touch position satisfies the picture adjustment trigger condition when it is determined that the touch position is located within a picture adjustment trigger region configured in the display interface; obtain a boundary distance between the touch position and each boundary of the display interface; and determine the adjustment speed based on the boundary distance.

In one embodiment, the adjustment unit 1606 is configured to obtain a reference value matching a type of the target application; determine a minimum distance value among the boundary distances; and determine, as the adjustment speed, a ratio of the reference value to the minimum distance value.

In some embodiments, the embodiments to be implemented by each of the unit modules may refer to each of the method embodiments and are not repeated here.

Figure 17:
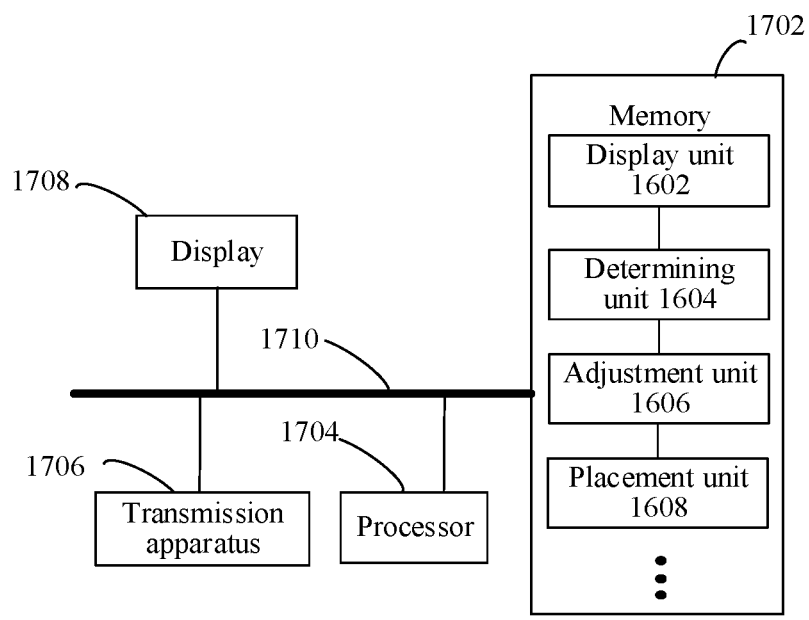
FIG. 17 is a schematic structural diagram of an electronic device according to embodiments of this application.

According to another aspect of the embodiments of this application, an electronic device for implementing the display picture adjustment method is also provided. The electronic device may be a terminal device or a server as shown in FIG. 1. In this embodiment, an example in which the electronic device is a terminal device is used for description. As shown in FIG. 17, the electronic device includes a memory 1702 and a processor 1704. A computer program is stored in the memory 1702, and the processor 1704 is configured to perform the steps in any one of the method embodiments through the computer program.

In some embodiments, the electronic device may be located in at least one of a plurality of network devices in a computer network.

In some embodiments, the processor may be configured to perform the following steps through the computer program:

S1: Run a target application, and display a first scene picture within a virtual scene and a target virtual object in a display interface.

S2: Determine a touch position where a drag operation is currently stopped in response to the drag operation performed on the target virtual object.

S3: Adjust, according to an adjustment speed matching the touch position, a scene picture displayed in the display interface when the touch position satisfies a picture adjustment trigger condition.

S4: Place the target virtual object in a target position within a second scene picture currently displayed in the display interface in response to a placement operation performed in the display interface.

In some embodiments, a person of ordinary skill in the art may understand that the structure shown in FIG. 17 is only for illustration. The electronic device may also be a terminal device such as a smartphone (such as an Android mobile phone or an iOS mobile phone), a tablet computer, a palmtop computer, a mobile Internet device (MID), or a PAD. FIG. 17 does not limit the structure of the electronic device. For example, the electronic device further includes more or less components (for example, a network interface) than these shown in FIG. 17, or has a configuration different from that shown in FIG. 17.

The memory 1702 may be configured to store a software program and a module, for example, a program instruction/module corresponding to a display picture adjustment method and apparatus in embodiments of this application. The processor 1704 performs various functional applications and data processing by running the software program and the module stored in the memory 1702, that is, implementing the display picture adjustment method. The memory 1702 may include a high-speed random memory, and may also include a non-volatile memory, for example, one or more magnetic storage apparatuses, a flash memory, or another non-volatile solid-state memory. In some embodiments, the memory 1702 may further include memories remotely disposed with respect to the processor 1704, and these remote memories may be connected to the terminal through a network. Examples of the network include, but are not limited to, the Internet, an intranet, a local area network, a mobile communication network, and a combination thereof. The memory 1702 may be, but is not limited to, be configured to store position information of each virtual object in the display interface, region information of the picture adjustment trigger region, etc. As an example, as shown in FIG. 17, the memory 1702 includes, but is not limited to, including the display unit 1602, the determining unit 1604, the adjustment unit 1606, and the placement unit 1608 in the display picture adjustment apparatus. In addition, the memory 1702 may further include, but is not limited to, other module units in the display picture adjustment apparatus, and no repeated description is provided in this example.

In some embodiments, the transmission apparatus 1706 is configured to receive or send data via a network. The specific network examples may include a wired network and a wireless network. In an example, the transmission apparatus 1706 includes a network interface controller (NIC). The NIC may be connected to another network device and a router by using a network cable, so as to communicate with the Internet or a local area network. In an example, the transmission apparatus 1706 is a radio frequency (RF) module, which communicates with the Internet in a wireless manner.

In addition, the electronic device further includes: a display 1708, configured to display a scene picture included in the display interface and a virtual object; and a connection bus 1710, configured to connect module components in the foregoing electronic device.

In another embodiment, the terminal device or the server may be a node in a distributed system. The distributed system may be a blockchain system, and the blockchain system may be a distributed system formed by connecting the plurality of nodes through network communication. The nodes may form a peer-to-peer (P2P) network, and any form of computing devices, such as servers, terminals, and other electronic devices may become nodes in the blockchain system by joining the peer-to-peer network.

According to one aspect of this application, a computer program product is provided. The computer program product includes a computer program/instruction, and the computer program/instruction includes a program code used for performing the method shown in the flowchart. In such an embodiment, the computer program may be downloaded and installed from the network through the communication part, and/or installed from the detachable medium. When executed by a central processing unit, the computer program executes functions provided in the embodiments of this application.

The serial numbers of the foregoing embodiments of this application are merely for the purpose of description, and do not represent the merits of the embodiments. The specific embodiments may refer to the steps described in the method embodiments, and are not repeated here.

According to one aspect of this application, a computer-readable storage medium is provided. The processor of the computer device reads the computer instruction from the computer-readable storage medium. The processor executes the computer instruction, so that the computer device performs the display picture adjustment method provided in the foregoing optional implementations.

In some embodiments, the computer-readable storage medium may be configured to store a computer program for performing the following steps:

S1: Run a target application, and display a first scene picture within a virtual scene and a target virtual object in a display interface.

S2: Determine a touch position where a drag operation is currently stopped in response to the drag operation performed on the target virtual object.

S3: Adjust, according to an adjustment speed matching the touch position, a scene picture displayed in the display interface when the touch position satisfies a picture adjustment trigger condition.

S4: Place the target virtual object in a target position within a second scene picture currently displayed in the display interface in response to a placement operation performed in the display interface.

In some embodiments, a person of ordinary skill in the art may understand that all or some of the steps in the method in the foregoing embodiments may be performed by a program instructing related hardware of a terminal device. The program may be stored in a computer-readable storage medium. The storage medium may include: a flash drive, a read-only memory (ROM), a random-access memory (RAM), a magnetic disk, or an optical disc, etc.

If implemented in the form of software functional units and sold or used as an independent product, the integrated unit in the foregoing embodiments may also be stored in the computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the method in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and other division manners may be used during actual implementation. For example, a plurality of units or components are combined, or are integrated into another system, or some features are omitted or not performed. In addition, the coupling, or direct coupling, or communication connection between the displayed or discussed components may be the indirect coupling or communication connection through some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected based on actual needs to achieve the objectives of the solutions of the embodiments of this application.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

In this application, the term "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit can be implemented using one or more processors (or processors and memory). Likewise, a processor (or processors and memory) can be used to implement one or more units. Moreover, each unit can be part of an overall unit that includes the functionalities of the unit. The descriptions are merely exemplary implementations of this application. A person of ordinary skill in the art may further make several improvements and modifications without departing from the principle of this application, and the improvements and modifications fall within the protection scope of this application.

What is claimed is:

1. A method performed by an electronic device, the method comprising:
    displaying a first scene picture of a virtual scene in a display interface;
    determining a current position of a continuous trigger operation in the display interface; and
    when the current position satisfies a picture adjustment trigger condition, adjusting the first scene picture in the display interface at an adjustment speed that is determined based on a distance between the current position and a target boundary among boundaries of the display interface.

2. The method according to claim 1, wherein the picture adjustment trigger condition is the current position being within a picture adjustment trigger region in the display interface.

3. The method according to claim 1, wherein:
    the target boundary has a shortest distance to the current position among the boundaries of the display interface.

4. The method according to claim 2, wherein at least a part of an outer boundary of the picture adjustment trigger region overlaps with at least a part of an outer boundary of the display interface.

5. The method according to claim 2, wherein the picture adjustment trigger region does not overlap with an operation region of the display interface, wherein the operation region comprising buttons.

6. The method according to claim 1, further comprising:
    determining a picture adjustment direction for adjusting the first scene picture according to a trajectory of the continuous trigger operation in the display interface.

7. The method according to claim 6, further comprising:
    determining a picture adjustment direction for adjusting the first scene picture according to tangential direction of the trajectory of the continuous trigger operation at the current position.

8. The method according to claim 1, wherein the continuous trigger operation is a dragging operation on a virtual object, and the method further comprising:
    in response to a release of the dragging operation, placing the virtual object in the first scene picture according to an ending position of the dragging operation in the display interface.

9. The method according to claim 1, further comprising:
    adjusting the adjustment speed according to a user operation in the display interface.

10. An electronic device, comprising a memory and a processor, a computer program being stored in the memory that, when executed by the processor, causes the electronic device to perform a method for updating a virtual scene, the method including:
    displaying a first scene picture of a virtual scene in a display interface;
    determining a current position of a continuous trigger operation in the display interface; and
    when the current position satisfies a picture adjustment trigger condition, adjusting the first scene picture in the display interface at an adjustment speed that is determined based on a distance between the current position and a target boundary among boundaries of the display interface.

11. The electronic device according to claim 10, wherein the picture adjustment trigger condition is the current position being within a picture adjustment trigger region in the display interface.

12. The electronic device according to claim 10, wherein:
the target boundary has a shortest distance to the current position among the boundaries of the display interface.

13. The electronic device according to claim 11, wherein at least a part of an outer boundary of the picture adjustment trigger region overlaps with at least a part of an outer boundary of the display interface.

14. The electronic device according to claim 11, wherein the picture adjustment trigger region does not overlap with an operation region of the display interface, wherein the operation region comprising buttons.

15. The electronic device according to claim 10, wherein the method further comprises:
determining a picture adjustment direction for adjusting the first scene picture according to a trajectory of the continuous trigger operation in the display interface.

16. The electronic device according to claim 15, wherein the method further comprises:
determining a picture adjustment direction for adjusting the first scene picture according to tangential direction of the trajectory of the continuous trigger operation at the current position.

17. The electronic device according to claim 10, wherein the continuous trigger operation is a dragging operation on a virtual object, and the method further comprising:
in response to a release of the dragging operation, placing the virtual object in the first scene picture according to an ending position of the dragging operation in the display interface.

18. The electronic device according to claim 10, wherein the method further comprises:
adjusting the adjustment speed according to a user operation in the display interface.

19. A non-transitory computer-readable storage medium, storing a computer program therein, the computer program, when executed by a processor of an electronic device, causing the electronic device to perform a method for updating a virtual scene, the method including:
displaying a first scene picture of a virtual scene in a display interface;
determining a current position of a continuous trigger operation in the display interface; and
when the current position satisfies a picture adjustment trigger condition, adjusting the first scene picture in the display interface at an adjustment speed that is determined based on a distance between the current position and a target boundary among boundaries of the display interface.

20. The non-transitory computer-readable storage medium according to claim 19, wherein the picture adjustment trigger condition is the current position being within a picture adjustment trigger region in the display interface.

21. The non-transitory computer-readable storage medium according to claim 19, wherein:
the target boundary has a shortest distance to the current position among the boundaries of the display interface.

22. The non-transitory computer-readable storage medium according to claim 19, wherein the method further comprises:
determining a picture adjustment direction for adjusting the first scene picture according to a trajectory of the continuous trigger operation in the display interface.

* * * * *